US007937760B2

(12) United States Patent
Ross et al.

(10) Patent No.: US 7,937,760 B2
(45) Date of Patent: May 3, 2011

(54) SYSTEM SECURITY AGENT AUTHENTICATION AND ALERT DISTRIBUTION

(75) Inventors: Alan D. Ross, Shingle Springs, CA (US); Dennis M. Morgan, Pine Grove, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/616,709

(22) Filed: Nov. 11, 2009

(65) Prior Publication Data

US 2010/0057907 A1 Mar. 4, 2010

Related U.S. Application Data

(62) Division of application No. 11/026,646, filed on Dec. 30, 2004, now Pat. No. 7,631,354.

(51) Int. Cl.
*H04K 1/00* (2006.01)

(52) U.S. Cl. ........................................................ 726/22

(58) Field of Classification Search ............. 726/22–25; 713/151, 168, 171, 188
See application file for complete search history.

(56) References Cited

U.S. PATENT DOCUMENTS

| | | | | |
|---|---|---|---|---|
| 5,956,388 | A * | 9/1999 | Parker et al. | 379/42 |
| 6,704,874 | B1 * | 3/2004 | Porras et al. | 726/22 |
| 7,162,649 | B1 * | 1/2007 | Ide et al. | 713/165 |
| 7,219,239 | B1 * | 5/2007 | Njemanze et al. | 726/3 |
| 7,295,950 | B2 * | 11/2007 | Iyengar | 702/182 |
| 7,330,109 | B2 * | 2/2008 | Martin | 340/506 |
| 7,376,902 | B2 * | 5/2008 | Lueckhoff | 715/752 |
| 2005/0216577 | A1 * | 9/2005 | Durham et al. | 709/223 |
| 2006/0005254 | A1 * | 1/2006 | Ross | 726/27 |

* cited by examiner

*Primary Examiner* — Beemnet W Dada
(74) *Attorney, Agent, or Firm* — Blakely, Sokoloff, Taylor & Zafman LLP

(57) ABSTRACT

An aggregation agent may combine and correlate information generated by multiple on-host agents and/or information generated in response to multiple security events. The aggregation agent may transmit the combined information to a security console. The security console may check the identity of the aggregation agent to determine whether to accept the information. The security console may map information to one or more consoles.

18 Claims, 5 Drawing Sheets

SYSTEM SECURITY AGENT AUTHENTICATION AND ALERT DISTRIBUTION

CROSS REFERENCE TO RELATED APPLICATIONS

This application is a Divisional of U.S. application Ser. No. 11/026,646, filed Dec. 30, 2004 now U.S. Pat. No. 7,631,354.

FIELD

Embodiments of the invention relate to network security and particularly to host agent-based security management.

BACKGROUND

To address the increase in malware (e.g., virus, worm) and unwanted system intrusions (e.g., hacker, denial of service attack), the number of security protections has increased on electronic devices/machines, including computers, personal digital assistants (PDAs), or other networked devices. Many agent-based security solutions are currently employed, an agent being hardware and/or software that may monitor system conditions, detect anomalous behavior, prevent attacks, etc. The number and complexity of the agents is increasing, and each agent may generate alert messages or other security-related information/reports to transmit to a remote security console/server. If a security breach were to occur, it may affect areas monitored by multiple agents, each of which may generate an alert/report. Thus, duplicate information may be crowding the network bandwidth as the agents report to a remote security console. Furthermore, as the number of agents increases, the number of ports open on the host machine typically increases as each agent establishes a link over which to report. As more ports are opened, potential vulnerability of the host increases, as each port represents a potential attack point for the system. Furthermore, as the number of agents increases, the complexity of security management increases. Additionally, there is currently no provision to ensure that alerts/reports are coming from the agents/entities that appear to be sending them.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
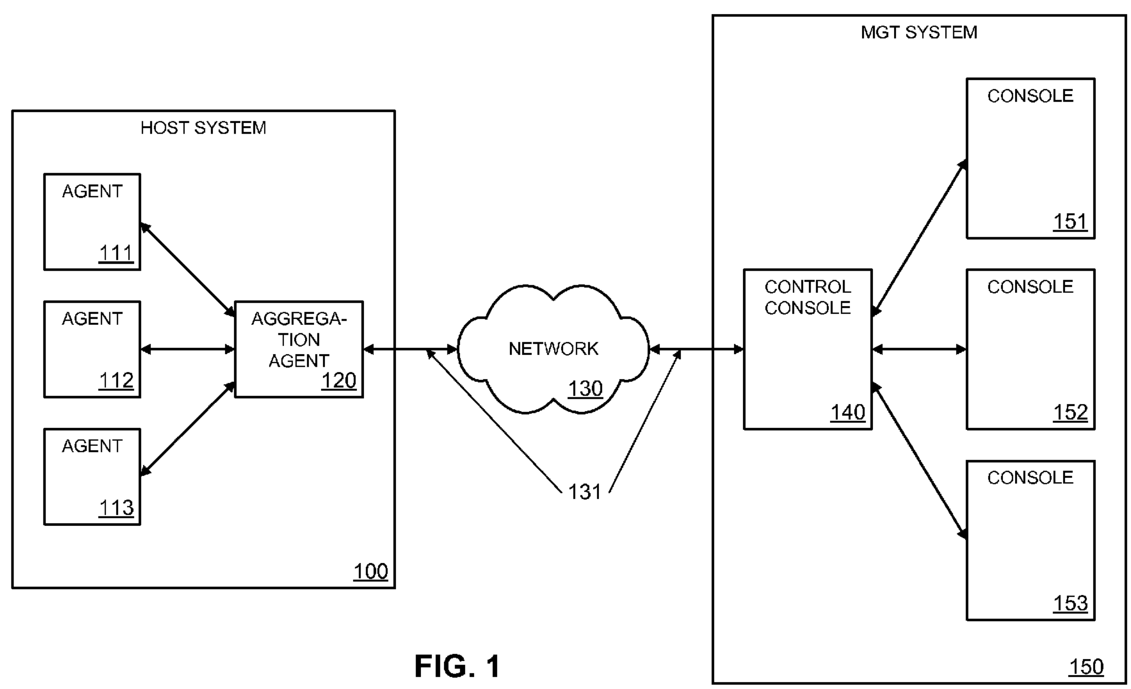
FIG. 1 is a block diagram of an embodiment of a system with an aggregation agent coupled with multiple host agents and a control console.

Various references herein to an "embodiment" are to be understood as describing a particular feature, structure, or characteristic included in at least one embodiment or implementation of the invention. Thus, the appearance of phrases such as "in one embodiment," or "in alternate an embodiment" may describe various embodiments of the invention, and may not necessarily all refer to the same embodiment.

A networked system may be a computer or other computing device interacting with a network over a network interface medium (e.g., a network interface controller card, a wireless interface circuit, etc.). Such a system may include multiple agents to monitor various aspects of the system and/or system performance, and the agents may be resident on the system. An agent may be considered to be resident on the host if the agent is an embedded circuit and/or embedded system, a software module to execute on the system's operating environment (hardware and/or software, which may include an operating system), or is a standalone physical or software entity mounted on the system. Examples may include an antivirus application/program, intrusion detection system (IDS), intrusion prevention system (IPS), host-based firewall, compliance agent, vulnerability scanning agent, event log, patch monitor, or other component to perform a security function and generate security and/or alert information/data. In one embodiment an operating system also tracks certain security-related events, and the operating system subroutine/thread may be considered an "agent" for purposes of discussion herein. Thus, in a generic sense, an agent may be a part of an application/program that generates alert/report data.

In one embodiment the agents may be associated with one or more management consoles, which may be generically referred to as "consoles" herein. A console may be a physical entity and/or a software module operating at a security server coupled over a network to the host system having the agents. Just as multiple consoles may be associated with a single agent, a single console may manage multiple agents, and thus be associated with the multiple agents. Agents and consoles may thus have an interrelationship for data exchange, and management action by a console based on information from an agent. This interrelationship may be referred to by expressing that an agent corresponds to or is associated with a console, or vice versa. The data that may be passed from an agent to a console, or, for example, configuration settings that may be sent from the console to an agent may relate to security alerts. The alerts may indicate a vulnerability, an attack, a failure, an anomalous execution event, corrupt data, etc. An event may trigger multiple agents to generate alert data, and in some cases result in duplication of alert information.

Currently, alerts from security software and operating system components flow to individual consoles associated with the particular agent gathering and transmitting information. Thus, multiple ports may be open on a system merely to pass security information. Traditionally, the individual consoles send data to a central console for aggregation and correlation of alerts. This flow may result in a considerable time delay (lag) before triggering events at the host system may reach the central console and be dealt with. Such a delay may result in serious compromise of the host system and/or the network of which the host system is a client.

With an aggregation or correlation agent placed at the host system end of the network, many problems associated with traditional agent management may be ameliorated. In one embodiment an aggregation/correlation agent is mounted on the host system/client machine. As discussed in more detail below, the agent may be hardware, software, and/or a combination. In another embodiment the agent resides at a switch or router. The agent may aggregate and correlate alert data received from multiple agents on the host system. Functions that may be performed by the aggregation agent include, but is not limited by, one or more of the following: authenticating the multiple agents, authenticating itself (the aggregation agent) to a security server, aggregating alert information, correlating alert information, compressing an alert message, and communicating alert information to one or more security consoles. The agent may also provide functions to encrypt and/or sign the aggregated data. The aggregation agent may have access to a secure storage and/or a secure communication link to reduce the risk of compromise of the aggregation agent and reduce the risk of spoofing the agent.

Aggregating and correlating the alert information may include combining multiple alerts from an agent into a single alert message (cross-message aggregation), combining alerts from multiple agents into a single alert message (cross-agent aggregation), a combination of these two, analyzing the alerts and intelligently combining selected ones of the alerts into a single alert message, and generating a tag to associate an alert with an agent. Aggregating and/or compressing the data/alert message may serve to reduce the number of ports open, and the communication bandwidth. Encrypting and/or signing the data/alert message may serve to secure the message from attack and/or validate that the data is indeed passed from the entity purporting to transmit the data/alert message.

In one embodiment the aggregation agent communicates with each individual console to provide alert data of interest to the console (e.g., data associated with an on-host agent corresponding to the console, an alert that affects a resource monitored by the console). In an alternate embodiment, the aggregation agent communicates directly with a central or control console, which may then distribute information to individual consoles. In addition to receiving and distributing the alert data, the central console may manage a secure link with the aggregation agent, for example, configuring the link for communication between the aggregation agent and the central console. Configuration of the communication link between the aggregation agent and the central console may include setting a channel, dynamically altering a configuration established at initialization, setting a protocol, specifying an encryption standard, etc.

FIG. 1 is a block diagram of an embodiment of a system with an aggregation agent coupled with multiple host agents and a control console. Host system 100 represents a machine, device, apparatus, etc., that may be a client of a network. Host system 100 may be a computer (desktop, laptop, palmtop), a gaming console, a handheld computing device, a server, etc. Host system 100 includes multiple agents 111-113. Agents 111-113 may be hardware and/or software components to monitor security of system 100 and/or manage a resource on system 100. For example, any of agents 111-113 may represent an antivirus agent, host IDS, host IPS, host firewall, compliance agent, operating system (OS) security event monitor, etc.

Host system 100 may include aggregation agent 120, which represents an agent to aggregate and correlate data from agents 111-113. In one embodiment aggregation agent 120 represents a hardware-based agent that resides on the hardware of host system 100, below the OS. Thus, aggregation agent 120 may not be visible/accessible to the host OS and/or other elements of the operating environment of host system 100.

Each of agents 111-113 may collect and/or generate data indicating a security state of a resource of host system 100, which is forwarded to aggregation agent 120. Aggregation agent 120 may operate as a local authentication entity for agents 111-113. In this manner, aggregation agent 120 may authenticate that information received that is purported to be from a particular agent is actually from the purported agent. For example, one simple method may be to perform a hash on an agent application executable. Hardware agents may present keys. Thus, aggregation agent 120 may verify the validity of agents 111-113.

Aggregation agent 120 may aggregate data from agents 111-113 in a variety of ways. For example, agent 111 may generate multiple alerts, which may be sent individually to aggregation agent 120. Rather than sending multiple alert messages from agent 111, aggregation agent 120 may aggregate the multiple alerts into a single alert message, and tag the message as corresponding to agent 111. In another example, agent 111 and agent 112 may generate the same or a similar alert message or generate data resulting from the same security event. Rather than sending alerts from two separate agents when the alerts correspond to the same security event, aggregation agent 120 may transmit a single alert, the alert being tagged as corresponding to both agent 111 and agent 112 (e.g., including two identifiers in the message). Additionally, agent 111 and agent 112 may generate alert data using a common alert format (for example, a standard security alert message), which can be consolidated into a single message of the common format, with alert information included from both agents.

In one embodiment aggregation agent 120 includes intelligence (e.g., logic to determine and/or compare the contents of reports/alerts, to process information received at aggregation agent 120, etc.) to enable aggregation agent 120 to selectively report alerts. For example, agent 113 may indicate an alert to aggregation agent 120. Aggregation agent 120 may recognize the alert as corresponding to a known vulnerability and/or attack against which a compliance agent in system 100 indicates that system 100 is inoculated. System 100 may be inoculated against a threat if it has updates/patches installed, has defense mechanisms in place that recognize and/or operate against a threat or vulnerability, etc. With a valid compliance agent/engine operating on system 100, aggregation agent 120 may determine that there is no need to generate an alert to a security server for an attack that poses no threat to system 100. In such an implementation aggregation agent 120 may have, or have access to, a security policy, a reporting policy, and/or attack signature information.

In addition to aggregation and correlation, aggregation agent 120 may include capabilities to encrypt and/or sign (attest) alert messages to be sent over network 130. In one embodiment the encryption standard may be specified by a receiving entity, for example, control console 140 of management system 150. Signing the alert message may include use of a cryptographic key to encode the message. Signing the alert may provide assurance to a receiving entity (e.g., a consol) that the entity sending the alert is an entity that should send the alert, and that the entity is indeed who/what it purports to be. This may, for example, reduce exposure to spoofing. Aggregation agent 120 may also compress alert data in addition to aggregating the data, to further reduce network traffic usage. While aggregation agent 120 in one embodiment transmits alert data to control console 140, in an alternate embodiment aggregation agent 120 directly transmits alert data to a console 151-153 corresponding to the agent 111-113 from which the data originated.

Link 131 over network 130 represents a transmission path from aggregation agent 120 to management system 150. Link 131 may include a wired or wireless transmission path. The transmission path may be over coaxial cable, twisted pair (e.g., Category-5 cable), etc. In one embodiment control console 140 manages link 131, and indicates a port, channel, protocol, encryption, etc. These configurations may be selected in an authentication process when the link is established. The configurations may be dynamically modifiable by control console 140. In one embodiment control console 140 may re-direct aggregation agent 120 from communicating with control console 140 to a different console, for example, in the case of failover.

Control console 140 and consoles 151-153 represent hardware and/or software security enforcement and/or security decision points. They may, for example, be secure enterprise applications on a security server. Management system 150 represents a security system, or security management that may, in one embodiment manage security of a local area network 130. Consoles 151-153 may correspond to each of agents 111-113, and thus may include antivirus enforcement, IDS, IPS, or firewall control, a compliance server, a security event server, etc. Consoles 151-153 may be mapped one to one (have a single corresponding console for each agent), as well as being mapped M to N, where M and N are integers that may not be equal. For example, one or more agent and console combinations may correspond to an N to one or one to N relationship. In one embodiment control console 140 authenticates consoles 151-153 when distributing alert information.

Control console 140 may receive an aggregated message, having data aggregated in any manner discussed above, as well as receiving data aggregated in different ways from aggregation agent 120. Thus, for example, if agents 111 and 112 represent agents sharing a common alert format, and agent 113 uses a different alert format, aggregation agent 120 may aggregate an alert generated by agent 113 with another alert generated by agent 113 and transmit the aggregated alert, as well as cross-correlating alerts from agents 111 and 112 and transmitting an aggregated alert with data from both agents to control console 140. Control console 140 may, in response to receiving the alert message, determine which of consoles 151-153 should receive the message. In one embodiment this involves resolving a tag or identifier in the message and transporting the message to the indicated entity. Alternatively, or in addition, this may involve storing/managing a list of information desired by each individual console 151-153, and pass specific information to the appropriate console 151.

Figure 2:
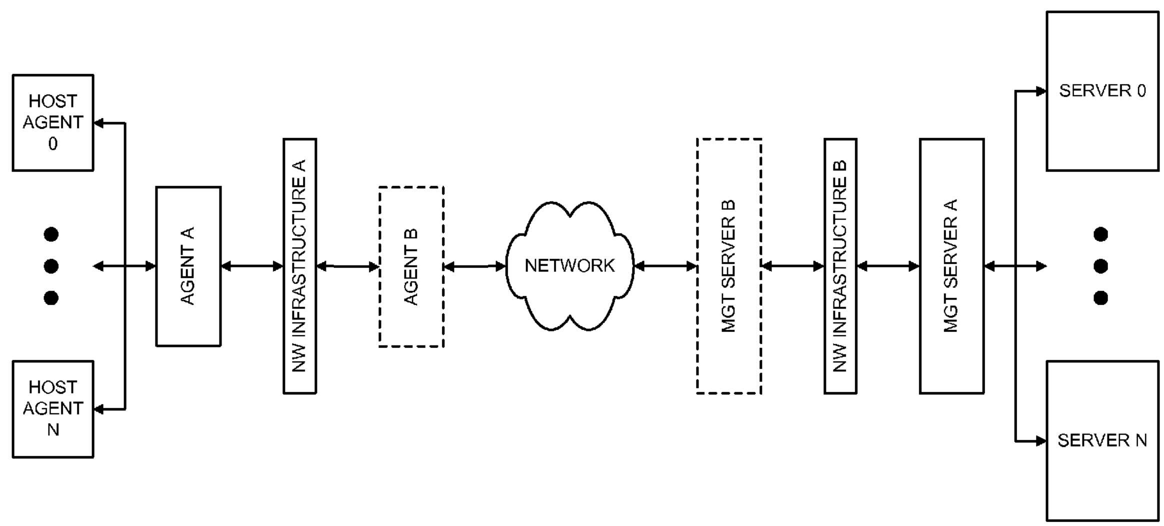
FIG. 2 is a block diagram of an embodiment of an agent coupled with multiple agents and a management server.

FIG. 2 is a block diagram of an embodiment of an agent coupled with multiple agents and a management server. The system of FIG. 2 includes multiple host agents 0 to N, which represent agents on host machine that monitor security events and produce alerts, logs, and/or other data regarding the security events. Each of host agent 0 to host agent N may monitor different resources, and may reside in software or hardware. In one embodiment host agents 0 to N are authenticated by agent A, which may be coupled with agents 0 to N over a communication bus, and/or through a software mechanism (e.g., a linked library function, an application programming interface, etc.). Agent A may be an aggregation or correlation agent, as explained above.

In one embodiment agent A resides on the host machine on which host agents 0 through N reside. In another embodiment agent A resides outside of the host machine, for example, at a local area network server, a wireless access point, or a router. There may be benefits to having agent A reside on the host machine as opposed to outside the host machine. For example, having agent A outside the host machine may still require host agents 0 through N to have a large number of ports open to communicate with agent A. However, there may be advantages in the implementation of the aggregation functions outside the host machine, such as the development and deployment of agent A.

Agent A may connect to the network through network infrastructure A, which may represent a server, an access point, a switch, a router, etc., or a combination of these. Agent A is not necessarily directly coupled to network infrastructure A. In one embodiment an agent B may be present in the system. Agent B may be a correlation or aggregation agent as is agent A. In one embodiment agent B represents agent A located on the network side of network infrastructure A rather than on the client side of network infrastructure A. In addition to representing an alternate deployment of agent A, agent B may also represent a distribution of the functions of agent A, which may execute some functions on the client side of network infrastructure A as well as functions on the network side of network infrastructure A. For example, agent A may represent the aggregation functions, and agent B could represent compression and/or encryption functions.

At the security management side, a management server B may reside on the network side of network infrastructure B. Network infrastructure B may be similar or the same as network infrastructure A, but is located at the security management side of the network. As with the potential distribution of the functions of the aggregation agent, or the alternate locations for the aggregation agent as represented by agent A and agent B, a management server or console may have distributed functions, or may have alternate locations, as represented by management server A and management server B. The management server may be understood to represent or to include a control console, as discussed above. Thus, management server A may distribute data received from agent A to servers 0 to N, which may correspond to a host agent 0 to N.

Figure 3:
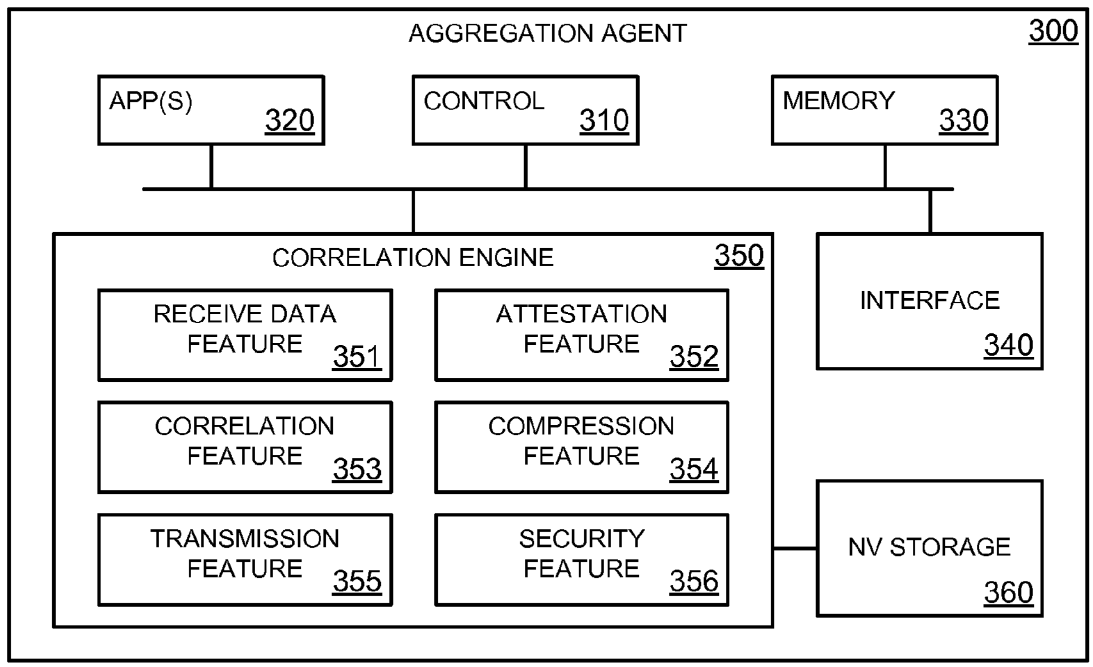
FIG. 3 is a block diagram of an embodiment of an aggregation agent having a correlation engine.

FIG. 3 is a block diagram of an embodiment of an aggregation agent having a correlation engine. Aggregation agent 300 represents a software module, a combination of logic, hardware, firmware and/or group/series/set of instructions for execution on a computation/logic device, a subsystem, or a virtual subsystem that is configured, enabled, or otherwise able to perform operations related to correlating and/or aggregating alert/security data received from multiple host agents. Control logic 310 directs the flow of operation of aggregation agent 300. In one embodiment, control logic 310 may represent a series of software/firmware instructions to perform logic operations. In another embodiment, control logic 310 may be implemented by hardware control logic, or a combination of hardware-based control logic and software instructions. Hardware control logic may include discrete circuits, a processor, a microcontroller, a logic array, etc.

Interface 340 may provide a communication interface between aggregation agent 300 and a software module/program/application, a computing platform, an external electronic system (not shown), and/or network. For example, aggregation agent 300 may run on a computing platform on a computing system/device with interface 340 to provide a communication interface to resources on the computing system, for example, programs, software libraries, processors, etc.

In one embodiment application 320 may represent an application running on aggregation agent 300. In another embodiment application 320 may represent one or more programs and/or other series of instruction sequences provided from outside aggregation agent 300, for example, over interface 340 to be executed on control logic 310. In one embodiment aggregation agent 300 may execute part of all of a user application or a system application. Application 320 may provide instructions to control logic 310 to cause or result in aggregation agent 300 performing an operation.

Instructions and/or data may also be provided to control logic 310 by memory 330. For example, control logic 310 may access, or read a portion of memory 330 to obtain instructions to perform a series of operations and/or data for use with operations. Thus, control logic 310 can receive one or more instructions from internal application software running locally associated with aggregation agent 300, such as application 320, from memory 330, and/or from an external application, storage medium, etc., through interface 340. Memory 330 may also store information for use by aggregation agent 300 and/or represent a memory accessible to aggregation agent 300. For example, memory 330 may be a storage structure having statistics to be correlated.

Aggregation agent 300 includes correlation engine 350. Correlation engine 350 is shown with various features, which represent functions or features that correlation engine 350 may provide. Each function or feature may be provided through performing one or more operations. Correlation engine 350 may include one or more of: receive data feature 351, attestation feature 352, correlation feature 353, compression feature 354, transmission feature 355, and security feature 356. In one embodiment one or more of these features may exist independently of and/or be external to aggregation agent 300. Thus, correlation engine 350 may be more complex or less complex, containing some, all, or additional features to those represented in FIG. 3.

Receive data feature 351 may provide functionality to enable correlation engine 350 to gather data to aggregate from multiple agents. The host agents may be coupled with aggregation agent 300 over a bus or over a software link (e.g., a function call, a reserved memory location). In one embodiment receive data feature 351 includes polling or querying the agents to determine if they have data or alerts for aggregation agent 300. Other mechanisms of receiving data may be via interrupt, in that a host agent may trigger a software and/or hardware interrupt mechanism of aggregation agent 300 if an event occurs that generates an alert, or the use of a coordinated communication mechanism, for example, a round robin scheme. Receive data feature 351 may include functionality associated with receiving data in a standard format from one or more agents, and supporting the standard alert message format. Likewise, receive data feature 351 may need to support non-standard formats of data and interpret the data received.

Attestation feature 352 may provide functionality to enable correlation engine 350 to authenticate the agents with which aggregation agent 300 is coupled. This may be accomplished, for example, through use of a hash of the agent executable. Hardware agents may have keys. In addition to authenticating the host agents, attestation feature 352 may refer to the ability of attestation feature 352 to provide credentials to a management console to authenticate aggregation agent 300. In one embodiment aggregation agent 300 signs every message as a form of non-repudiation on messages from aggregation agent 300 to a management console. Keys may be used by attestation feature 352 to provide the secure information. Keys may be stored in a non-volatile storage. Non-volatile storage 360 represents a non-volatile storage medium accessible to aggregation agent 300, for example, a flash, a hard-drive, a trusted platform module (TPM). Non-volatile storage 360 is not necessarily a part of aggregation agent 300, nor is non-volatile storage 360 necessarily under the exclusive control of aggregation agent 300, although it may be. Non-volatile storage 360 may be a secure storage (e.g., a TPM), and in one embodiment is a storage location inaccessible to a host operating environment, for example, an operating system or host application.

Correlation feature 353 may provide functionality to enable correlation engine 350 to correlate data received from the multiple host agents. Correlation of data may include intelligent analysis of the data received. Data may be combined to reduce or eliminate duplicate information, or to reduce a number of messages sent. Correlation feature 353 may include the capability to combine multiple separate reports/alerts from the same or different agents into a single message, remove duplicate alerts, and tag data as corresponding to a particular one or ones of the host agents present in a client machine. In one embodiment correlation feature 353 include the ability to determine that a reported event is not a threat to the particular client machine, and so suppress the report. An event may not be a threat to a client machine if, for example, the client machine knows of the particular attack posed and has protective mechanism(s) in place to prevent susceptibility to the attack.

Compression feature 354 may provide functionality to enable correlation engine 350 to compress an aggregated data message that may be prepared for transmission to a management server/console. Techniques to compress data messages are known and will not be discussed in detail herein.

Transmission feature 355 may provide functionality to enable correlation engine 350 to send an aggregated message to a management entity, for example, a security server that may include a management console. In one embodiment transmission feature 355 provides the ability to communicate with a central console that distributes the message data to one or more consoles associated with a host agent that generated the data. In another embodiment transmission feature 355 transmits directly to a console associated with a host agent that generated the data. Transmission feature 355 may also include the ability to configure the communication link between aggregation agent 300 and a security server according to specifications given by the security server. In one embodiment this includes dynamically adjusting an established link, and may include switching between different security server entities.

Security feature 356 may provide functionality to enable correlation engine 350 to provide security in transmission of an aggregated data message. For example, security feature 356 may enable correlation engine 350 to sign the aggregated data message and/or provide authentication credentials to a receiving entity (e.g., a console). In one embodiment this may include presenting a cryptographic key, which may be stored in a secure memory device. Security feature 356 may also enable correlation engine 350 to encrypt data transferred from aggregation agent 300 to a security server/console. The encryption used may be based upon a configuration of aggregation agent 300 and/or be based upon an encryption standard indicated by the receiving entity. Correlation engine 350 may additionally compress the aggregated data message in preparation for transmission to the receiving entity.

Figure 4:
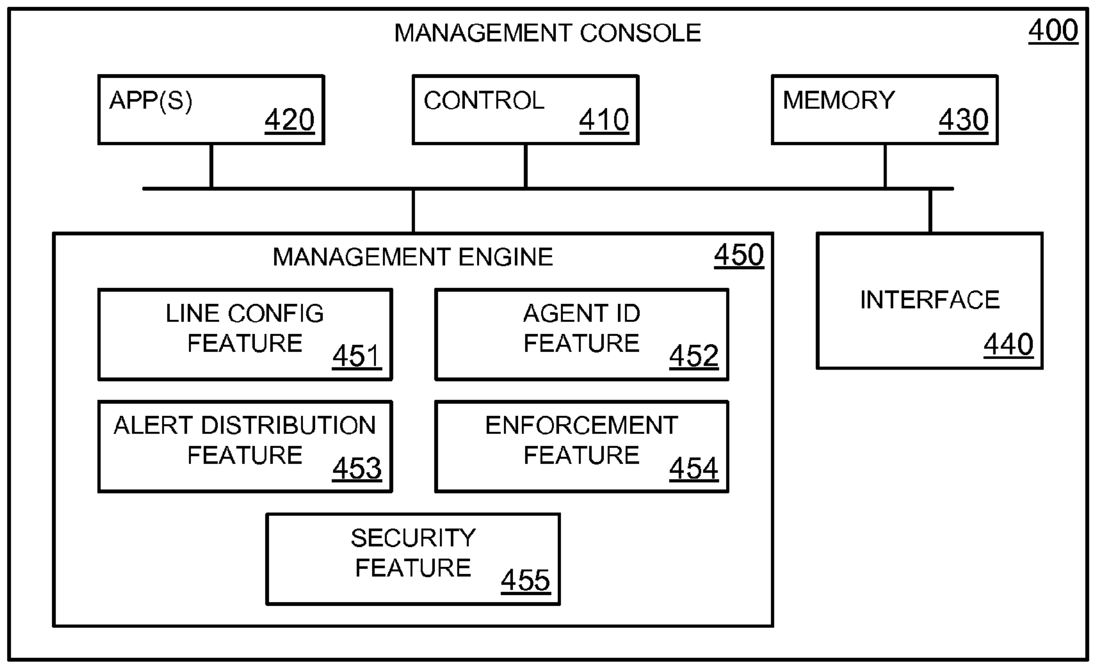
FIG. 4 is a block diagram of an embodiment of a management console having a management engine.

FIG. 4 is a block diagram of an embodiment of a management console having a management engine. Management console 400 represents a software module, a combination of logic, hardware, firmware and/or group/series/set of instructions for execution on a computation/logic device, a subsystem, or a virtual subsystem that is configured, enabled, or otherwise able to perform operations related to managing security data. Control logic 410 directs the flow of operation of management console 400. In one embodiment, control logic 410 may represent a series of software/firmware instructions to perform logic operations. In another embodiment, control logic 410 may be implemented by hardware control logic, or a combination of hardware-based control logic and software instructions. Hardware control logic may include discrete circuits, a processor, a microcontroller, a logic array, etc.

Interface 440 may provide a communication interface between management console 400 and a software module/program/application, a computing platform, an external electronic system (not shown), and/or network. For example, management console 400 may run on a computing platform on a computing system/device with interface 440 to provide a communication interface to resources on the computing system, for example, programs, software libraries, processors, etc.

Application(s) 420 represent one or more applications that may interact with management console 400. In one embodiment application 420 may represent an application running on management console 400. In another embodiment application 420 may represent one or more programs and/or other series of instruction sequences provided from outside management console 400, for example, over interface 440 to be executed on control logic 410. In one embodiment management console 400 may execute part of all of a user application or a system application. Application 420 may provide instructions to control logic 410 to cause or result in management console 400 performing an operation.

Instructions and/or data may also be provided to control logic 410 by memory 430. For example, control logic 410 may access, or read a portion of memory 430 to obtain instructions to perform a series of operations and/or data for use with operations. Thus, control logic 410 can receive one or more instructions from internal application software running locally associated with management console 400, such as application 420, from memory 430, and/or from an external application, storage medium, etc., through interface 440. Memory 430 may also store information for use by management console 400 and/or represent a memory accessible to management console 400. For example, memory 430 may be a storage structure having statistics to be correlated.

Management console 400 includes management engine 450. Management engine 450 is shown with various features, which represent functions or features that management engine 450 may provide. Each function or feature may be provided through performing one or more operations. Management engine 450 may include one or more of: line configuration feature 451, agent identification feature 452, alert distribution feature 453, enforcement feature 454, and security feature 455. In one embodiment one or more of these features may exist independently of and/or be external to management console 400. Thus, management engine 450 may be more complex or less complex, containing some, all, or additional features to those represented in FIG. 4.

Line configuration feature 451 may provide functionality to enable management engine 450 to control configuration of a link between management console 400 and an aggregation agent over which management console 400 receives aggregated security data. The configuration may occur at initialization of the aggregation agent, or at initialization of the link as the aggregation agent attempts to establish the communication path with which to send security data. The configuration may include settings related to the port, channel, protocol, encryption standard, bit rate, etc. In one embodiment the link is private between management console 400 and the aggregation agent, and controlled with line configuration feature 451.

Agent identification feature 452 may provide functionality to enable management engine 450 to authenticate the aggregation agent sending security information. The aggregation agent may be authenticated at the initialization of the communication link between the aggregation agent and management console 400. Agent identification feature 452 in one embodiment expects a signature and/or other form of attestation by the aggregation agent on every message sent to management console 400. This may reduce the possibility of spoofing, and improve the possibility that the security message is being provided by the entity that management console 400 believes is sending the message.

Alert distribution feature 453 may provide functionality to enable management engine 450 to determine which of multiple consoles should receive data from a security alert/report message. In one embodiment this includes obtaining a console identifier from the message and forwarding the message to the proper console. In another embodiment alert distribution feature 453 includes managing a list, map, or table (e.g., a look-up table) with information that is requested by each console. Alert distribution feature 453 may extract a data element from a received message and determine with the list/table which console or consoles should receive the information. For example, a breach of a host-based firewall may trigger both a host firewall agent and a compliance agent to register security events, which may be sent to the aggregation agent. The aggregation agent may determine that the event alerts overlap, and so aggregates the alert into a single "firewall breach" alert that is transmitted to management console 400. Alert distribution feature 453 may then determine from a look-up table that both the compliance console and the firewall management console want such a message. The message may then be forwarded on to the two (or potentially one or more than two) consoles. In similar fashion, an IDS agent and an antivirus agent may detect a virus event, and this message could be aggregated at the aggregation agent and mapped back out at management console 400.

Enforcement feature 454 may provide functionality to enable management engine 450 to take appropriate action based on the messages received at management console 400. This may include, for example, quarantining the client from the network, generating an alert to an administrator, etc.

Security feature 455 may provide functionality to enable management engine 450 to process a received message according to one or more security and/or transmission techniques. For example, an aggregated alert message may be received compressed from the transmitting agent. Security feature 455 may provide the ability to decompress the message to determine its contents and/or separate individual alerts from the aggregated alert message. Security feature 455 may provide the ability to decrypt an encrypted message from the agent. In one embodiment security feature 455 works in conjunction with line configuration feature 451 to provide the ability to receive and process a message according to a designated transmission configuration. Security feature 455 may provide authentication services and/or information to verify the identity of an agent. This may include the management of security keys for use in authentication.

Aggregation agent 300 of FIG. 3 and/or management console 400 may be implemented with firmware, software, or a combination of firmware and software. Aggregation agent 300 and/or management console 400 may be implemented in hardware and/or a combination of hardware and software and/or firmware. The software and/or firmware content may provide instructions to cause or result in executing hardware to perform various operations, including some or all of the functions/features described above. Instructions that may cause/result in the performing of functions/operations described herein may be received via an article of manufacture by a machine/electronic device/hardware and performed by/on the machine. An article of manufacture may include a machine accessible/readable medium having content to provide the instructions. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing system having code loaded on the computing system that the computing system may be able to execute when the computing system is in operation. Thus, delivering a computing system with such code may be understood as providing the article of manufacture with such content described above. Furthermore, storing code on a database or other memory location and offering the code for download over a communication medium via a propagated signal may be understood as providing the article of manufacture with such content described above. Thus, aggregation agent 300 and/or management console 400 may represent a software module and/or a general computing element (e.g., a processor), a specific computing element (e.g., dedicated logic) executing software/firmware, and/or a signal embodying data to define/provide instructions to execute features of aggregation agent 300 and/or management console 400.

Figure 5:
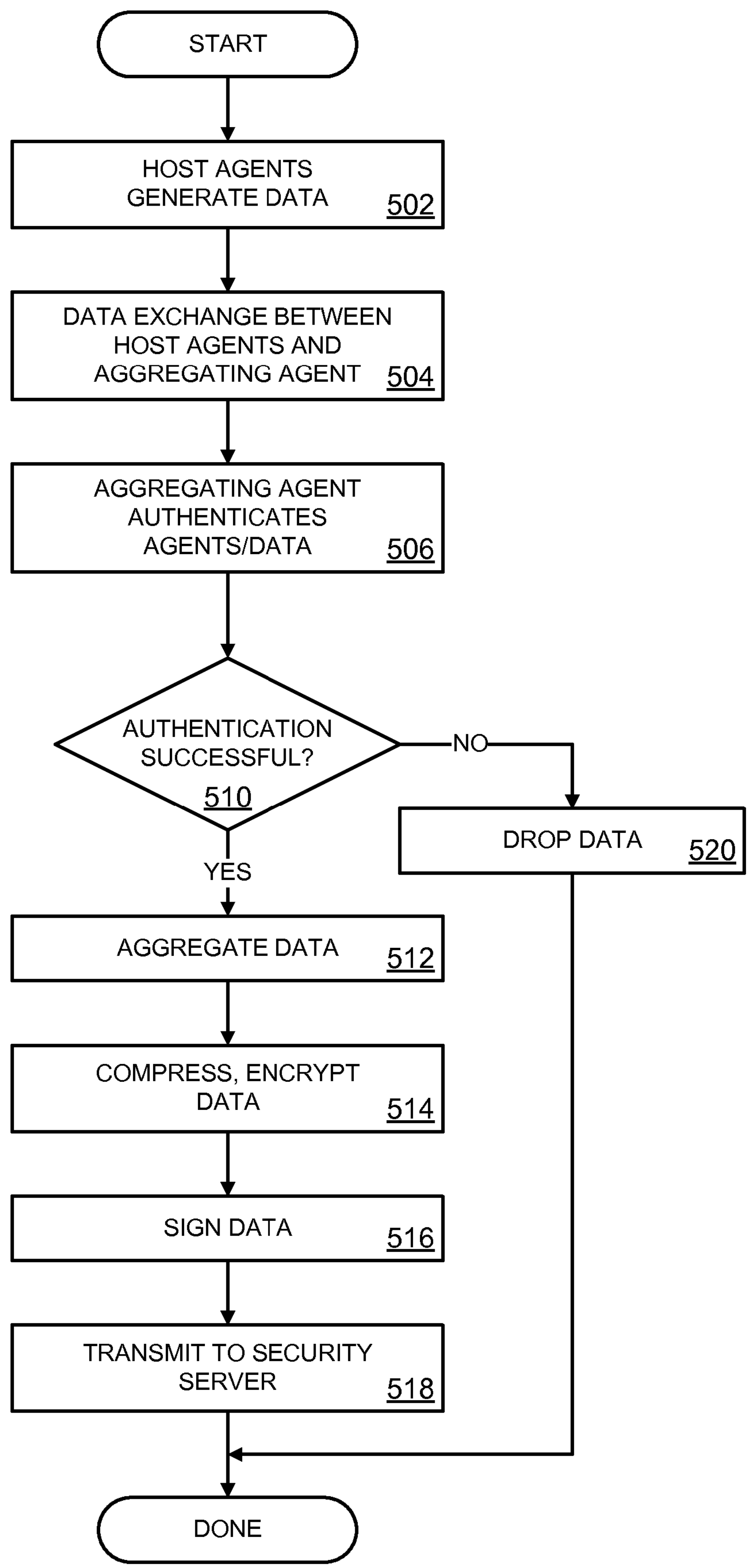
FIG. 5 is a flow diagram of an embodiment of an agent aggregating data received from other agents and forwarding the aggregated data.

FIG. 5 is a flow diagram of an embodiment of an agent aggregating data received from other agents and forwarding the aggregated data. Host agents, such as those discussed herein, generate data, 502. This data may be generated in response to a security event, for example, attack of a virus or worm, an attempted hacker intrusion, the disabling of a security measure, the corruption and/or failure of a security routine and/or associated data, etc. An aggregating agent may poll the host agents for data, or the host agents may volunteer data to the aggregating agent. Data may then be exchanged between the host agent and aggregating agent, 504. The aggregating agent may authenticate the host agents and/or the data received from the host agents, 506. The authentication of the host agents may occur prior to the data exchange between the host agents and the aggregating agent. Authentication of the host agents has been discussed above. Authentication of the data may include determining if a proper signature is found within the data received from the purported host agent.

If authentication is unsuccessful, 510, the any data received from the host agents at the aggregating agent may be dropped, 520. If the authentication is successful, 510, the aggregating agent may proceed to perform one or more processes on the data to prepare to transmit the data to the management console. For example, the aggregating agent may aggregate the data, 512, taking multiple alert messages and preparing a single alert message with all the alert data. The data may also be compressed according to known techniques, and/or encrypted, 514. Encryption may use any known encryption, whether standard or proprietary. The aggregating agent may also sign the data message, 516, and transmit the data to the management console on a security server, 518.

Figure 6:
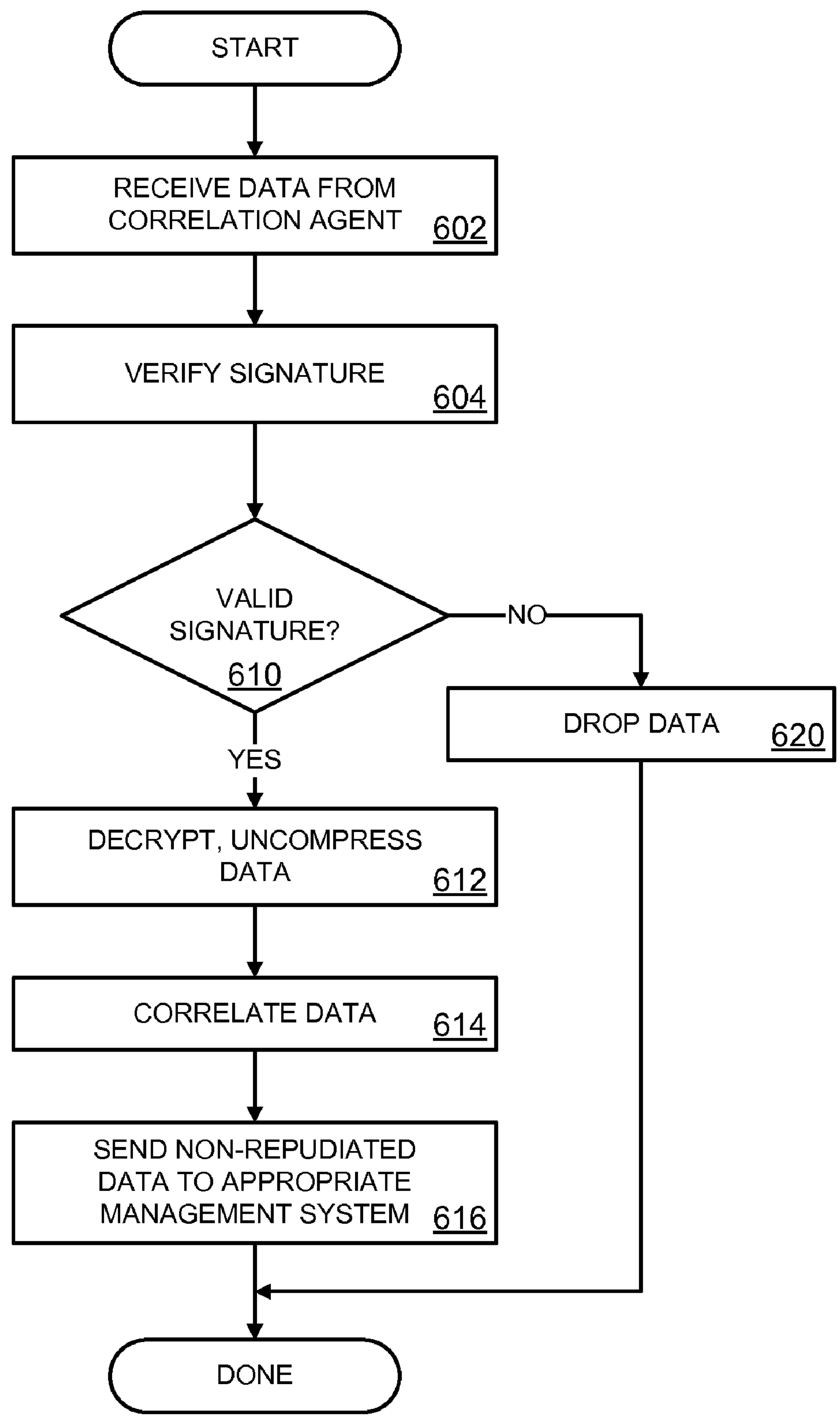
FIG. 6 is a flow diagram of an embodiment of a console receiving aggregated data and selectively sending the data to multiple management systems.

FIG. 6 is a flow diagram of an embodiment of a console receiving aggregated data and selectively sending the data to multiple management systems. A control console receives data from an aggregating agent, 602. The data may include alerts and/or other security information from a host agent regarding multiple different events, as well as information from multiple host agents. The data may be signed by the aggregating agent to certify authenticity of the message and the sending entity. The control console may verify a signature, 604, to determine that the information is in fact being sent from the proper entity.

If the signature is not valid, 610, any data received from the aggregating agent may be dropped, 620. If the signature is determined to be valid, 610, the control console may process the message. If the message is encrypted and/or compressed, the control console may decrypt and/or uncompress the message, 612. This may be based on standard techniques as are known, and would be the reverse procedures of those performed by the aggregating agent. Additionally, the control console may correlate the data, 614. In this context, correlating the data may refer to the control console determining a console associated with an agent and/or associated with the data in the message that should receive the information. Non-repudiated data may then be sent to the appropriate management system, for example, a management console, or a console associated with the host agent that generated the data, 616.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:

a receiver to receive from a transport agent on a communication link an aggregated security message, wherein the transport agent receives items of data from different respective on-host system agents of a host system, the on-host system agents monitoring the host system, each item of data representing a security event on the host system, wherein the transport agent aggregates the received items of data into the aggregated security message;

a communication line controller to configure the communication link to receive the aggregated security message; and a management engine including circuitry to authenticate the transport agent based on the received aggregated security message, and in response to authenticating the transport agent, to determine for each of the items of data of the aggregated security message a respective security server with which the item of data is associated, and to transmit each of the items of data from the aggregated security message to a respective management console.

2. The apparatus of claim 1, wherein the management engine to determine the associated security server of each of the items of data includes the management engine to determine a security server associated with an on-host system agent that generated one of the items of data.

3. The apparatus of claim 1, wherein the management engine to determine the associated security server of each of the items of data includes the management engine to decompress the aggregated security message to extract the aggregated security message from a compressed state.

4. The apparatus of claim 1, wherein the management engine to determine the associated security server of each of the items of data includes the management engine to determine in response to authenticating the transport agent.

5. The apparatus of claim 1, wherein the management engine to transmit each item of data includes the management engine to transmit one of the items of data to the associated security server of the one of the items of data.

6. The apparatus of claim 1, wherein the management engine to authenticate the transport agent includes the management engine to verify cryptographic keys received from the transport agent.

7. The apparatus of claim 1, the management engine further to decrypt the aggregated security message.

8. An apparatus according to claim 1, the communication line controller to configure the communication link dynamically, after the link has been established with the transport agent.

9. An apparatus according to claim 1, wherein the communication line controller to configure the communication link includes the communication line controller to configure one or more of a port, a communication protocol, a communication channel, an encryption standard, and a compression standard.

10. An apparatus according to claim 1, the communication line controller to further indicate a management console with which the transport agent should direct subsequent communication.

11. A system comprising:

a plurality of agents to monitor the system, each of the plurality of agents to generate a different respective one of host-based security event notifications, each host-based security event notification representing a respective security event on the host system;

an aggregation agent including circuitry to receive the host-based security event notifications, to aggregate the received host-based security event notifications into a single security report and transmit the single security report to a security server;

a router coupled with the aggregation agent to route the single security report from the aggregation agent to the security server; and the security server coupled with the router to receive the single security report and to indicate a host-based security event notification to a security console.

12. The system of claim 11, the security server further to authenticate the aggregation agent based on the received security report.

13. The system of claim 11, the security server to determine for each of the multiple security event notifications of the security report a respective security console with which the security event notification is associated.

14. The system of claim 13, wherein the security server to determine the associated security console of each of the multiple security event notifications includes the security server to determine a type of information indicated by one of the multiple security event notifications, and the security server to associate all security consoles configured to receive the type of information.

15. The system of claim 13, wherein the security server to determine the associated security console of each of the multiple security event notifications includes the security server to determine in response to authenticating the aggregation agent.

16. A system according to claim 13, wherein the security server to indicate the security event notification to the security console comprises the security server to indicate the security event notification to a security console associated with a host-based security event monitoring entity that generated the security event notification.

17. A system according to claim 11, wherein the aggregation agent resides on the host.

18. A system according to claim 11, wherein the aggregation agent to transmit the single security report to the security server comprises the aggregation agent to transmit the single security report to a control console on the security server.

* * * * *